US011842356B2

(12) United States Patent
Sheppard et al.

(10) Patent No.: US 11,842,356 B2
(45) Date of Patent: Dec. 12, 2023

(54) METHODS, SYSTEMS AND APPARATUS TO IMPROVE THE EFFICIENCY OF CALCULATING A CUSTOMER RETENTION RATE

(71) Applicant: The Nielsen Company (US), LLC, New York, NY (US)

(72) Inventors: Michael Sheppard, Holland, MI (US); Ludo Daemen, Duffel (BE)

(73) Assignee: The Nielsen Company (US), LLC, New York, NY (US)

( * ) Notice: Subject to any disclaimer, the term of this patent is extended or adjusted under 35 U.S.C. 154(b) by 77 days.

(21) Appl. No.: 16/598,667

(22) Filed: Oct. 10, 2019

(65) Prior Publication Data

US 2020/0160357 A1 May 21, 2020

Related U.S. Application Data

(63) Continuation of application No. 15/371,658, filed on Dec. 7, 2016, now abandoned.

(51) Int. Cl.
*G06Q 30/00* (2023.01)
*G06Q 30/0201* (2023.01)
*G06Q 10/067* (2023.01)

(52) U.S. Cl.
CPC ....... *G06Q 30/0201* (2013.01); *G06Q 10/067* (2013.01)

(58) Field of Classification Search
CPC ............. G06Q 30/0201; G06Q 10/067; G06Q 10/06395; G06Q 10/00; G06Q 10/02;
(Continued)

(56) References Cited

U.S. PATENT DOCUMENTS 8,332,269 B2 12/2012 Chatwin et al.
8,498,954 B2 * 7/2013 Malov ................ G06Q 30/0201
703/2

(Continued)

OTHER PUBLICATIONS

Fader, P., & Hardie, B. (2010). Customer-Base Valuation in a Contractual Setting: The Perils of Ignoring Heterogeneity. Marketing Science, 29, 85-93. (Year: 2010).*

(Continued)

*Primary Examiner* — Robert D Rines
*Assistant Examiner* — Jay-Ming Wang

(57) ABSTRACT

Methods, systems and apparatus to improve the efficiency of calculating a customer retention rate are disclosed herein. An example apparatus described herein that may be implemented to calculate a customer retention rate includes a retention rate model generator to generate a baseline retention rate model based on survivability data associated with an observed duration of interest, a shifted-beta-geometric distribution generator to generate a shifted-beta-geometric distribution model based on the survivability data, a model modifier to modify the baseline retention rate model based on the shifted-beta-geometric distribution model to create a modified retention rate model, and a model comparator to reduce a computational burden of calculating the customer retention rate by merging the modified retention rate model with the baseline retention rate model to generate a merged (Continued)

shifted-beta-geometric model, the merged shifted-beta-geometric model including first and second shifted-beta-geometric model parameters to determine the customer retention rate.

26 Claims, 4 Drawing Sheets

(58) Field of Classification Search
CPC ........ G06Q 10/06; G06Q 10/10; G06Q 30/02; G05B 2219/31357
See application file for complete search history.

(56) References Cited

U.S. PATENT DOCUMENTS

| | | | | |
|---|---|---|---|---|
| 9,471,978 | B2* | 10/2016 | Chen | G16H 20/10 |
| 10,198,505 | B2* | 2/2019 | Frank | G06Q 10/101 |
| 10,248,700 | B2* | 4/2019 | Diamond | G06F 16/26 |
| 10,325,272 | B2* | 6/2019 | Hunt | G06Q 30/0201 |
| 2007/0087756 | A1* | 4/2007 | Hoffberg | G06Q 30/08 |
| | | | | 455/450 |
| 2010/0145772 | A1* | 6/2010 | McCauley | G06Q 30/02 |
| | | | | 714/48 |
| 2011/0145657 | A1* | 6/2011 | Bishop | G06F 11/3442 |
| | | | | 714/47.1 |
| 2011/0295722 | A1* | 12/2011 | Reisman | G06Q 30/0641 |
| | | | | 705/26.1 |
| 2014/0278507 | A1* | 9/2014 | Potter | G06Q 30/0201 |
| | | | | 705/2 |
| 2015/0095137 | A1* | 4/2015 | Savelli | H04L 67/306 |
| | | | | 705/14.41 |
| 2018/0330388 | A1* | 11/2018 | Savelli | H04L 67/306 |

OTHER PUBLICATIONS

Krishnapillai, Gengeswari & Padmashantini, P. & Thahir, Sharmeela. (2013). Impact of Customer Retention Practices on Firm Performance. International Journal of Academic Research in Business and Social Sciences. 3. 10.6007/IJARBSS/v3-i7/10. (Year: 2013).*

Fader et al., "How to Project Customer Retention," Journal of Interactive Marketing Educational Foundation, Inc., DOI: 10.1002/dir, May 2007, 15 pages.

Github, Inc., "sBG Model of Customer Retention," Retrieved from the Internet: <https://github.com/jdmaturen/shifted_beta_geometric_py>, Retrieved on Sep. 13, 2016, 2 pages.

Mafrin, Igor, "Shifted-Beta-Geometric (sBG) Customer Lifetime Value Model," Retrieved from the Internet: <http://igormarfin.github.io/blog/2016/02/07/shiftedbetageometriccustomerlifetimevaluemodel/#.V9gjJ_krKUk>, Feb. 7, 2016, Retrieved on Sep. 13, 2016, 12 pages.

Fader et al., "Customer-Base Valuation in a Contractual Setting: The Perils of Ignoring Heterogeneity," Marketing Science, vol. 29, No. 1, Jan.-Feb. 2010, 9 pages.

United States Patent and Trademark Office, "Non-Final Office Action," issued in connection with U.S. Appl. No. 15/371,658, dated Jan. 25, 2019, 22 pages.

United States Patent and Trademark Office, "Final Office Action," issued in connection with U.S. Appl. No. 15/371,658, dated Jul. 10, 2019, 27 pages.

United States Patent and Trademark Office, "Advisory Action," issued in connection with U.S. Appl. No. 15/371,658, dated Oct. 1, 2019, 3 pages.

* cited by examiner

METHODS, SYSTEMS AND APPARATUS TO IMPROVE THE EFFICIENCY OF CALCULATING A CUSTOMER RETENTION RATE

RELATED APPLICATION

This patent arises from a continuation of U.S. patent application Ser. No. 15/371,658, filed on Dec. 7, 2016. U.S. patent application Ser. No. 15/371,658 is hereby incorporated herein by reference in its entirety.

FIELD OF THE DISCLOSURE

This disclosure relates generally to customer retention and, more particularly, to methods, systems, and apparatus to improve the efficiency of calculating a customer retention rate.

BACKGROUND

In recent years, customer retention has been predicted using models that estimate unknown retention rate data based on a known retention rate for a period of time. Modeling customer retention is helpful to gain valuable insight related to customer behavior and loyalty. This is particularly true in view of customer behaviors that are relatively dynamic, such as dynamic churn behaviors of customers/consumers that join and leave mobile phone providers, and/or other service contracts.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
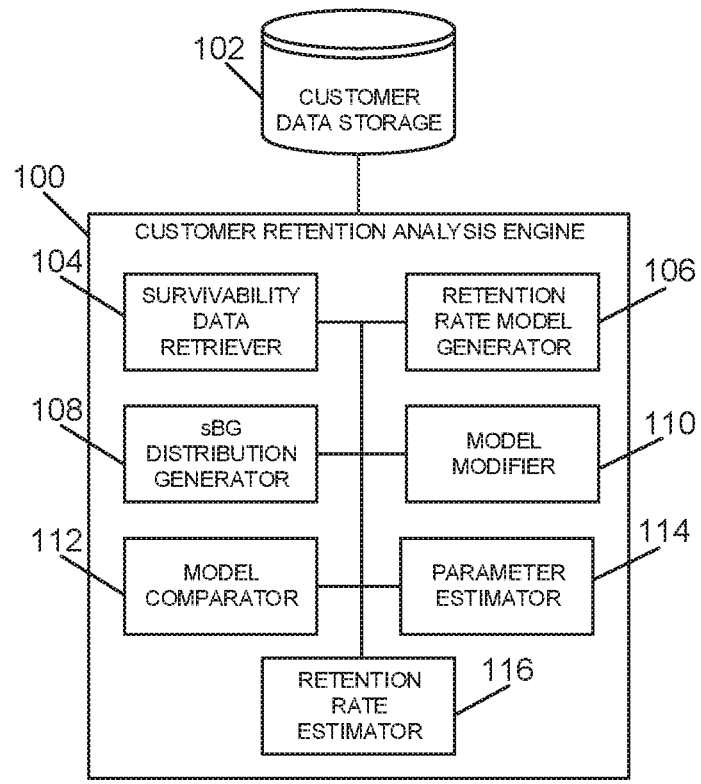
FIG. 1 is a schematic illustration of an example customer retention analysis engine constructed in accordance with the teachings of this disclosure to calculate a customer retention rate.

Modeling and predicting customer retention is an important aspect of customer behavior and loyalty. Customer retention represents a number of customers that have remained participants of a product or service of interest from a first time (e.g., a starting time, t=0 minutes, hours, weeks, months, years, etc.) to a second time (e.g., a current time such as five years after the starting time, t=5 years). Current techniques to model customer retention rates may use Maximum Likelihood (MLE) procedures to estimate parameters of a shifted-beta geometric (sBG) distribution model. In one example, an sBG model is used to model the retention rate over a period of time in which parameters of the sBG model are determined using algorithms. In an example technique to determine the retention rate of customers, a probability that a customer has survived (e.g., is still active) at a given time is determined. The retention rate is a proportion of customers still active at the end of a time period of interest based on a probability that a customer has survived. Based on the probability, traditional techniques apply the computationally intensive MLE procedures to determine a prediction for an expected tenure or lifetime of a customer. The customer lifetime can be predicted based on available data for a first time period. Such computationally intensive MLE procedures invoke many modeling iterations (e.g., hundreds or thousands of iterations) to determine the customer retention rate. Estimating the parameters using such complicated computational techniques requires a large amount of computational memory and performance for one or more processors.

In some examples, an sBG probability is implemented to estimate whether a randomly chosen customer will have a particular lifetime (e.g., one year, two years, etc.). The traditional sBG probability techniques include parameters $\alpha$ and $\beta$. To determine the values of $\alpha$ and $\beta$, which are used to estimate the sBG probability, numerical optimization methods (e.g., iterations using a solver) are used. The resulting values for $\alpha$ and $\beta$ are called maximum likelihood estimates of the sBG parameters $\alpha$ and $\beta$. In some examples, a log-likelihood function is maximized to determine the maximum likelihood estimates of the sBG parameters $\alpha$ and $\beta$. To verify the estimated values of the sBG parameters $\alpha$ and $\beta$, the MLE procedures are repeated using a different set of starting values. The customer retention rate can then be calculated using an sBG distribution model. Due to the iterations and repetition of the traditional MLE procedures, this method of determining a customer retention rate is computationally intensive (e.g., for processors of a machine).

An example apparatus disclosed herein calculates a customer retention rate with a retention rate model generator to generate a baseline retention rate model based on survivability data associated with an observed duration of interest, a shifted-beta-geometric distribution generator to generate a shifted-beta-geometric distribution model based on the survivability data, a model modifier to modify the baseline retention rate model based on the shifted-beta-geometric distribution model to create a modified retention rate model, and a model comparator to reduce a computational burden of calculating the customer retention rate by merging the modified retention rate model with the baseline retention rate model to generate a merged shifted-beta-geometric model, the merged shifted-beta-geometric model including a shifted-beta-geometric model parameters to determine the customer retention rate.

Example apparatus disclosed herein also include a customer data storage to store customer data, including survivability data. Example apparatus disclosed herein also include a survivability data retriever to retrieve customer survivability data from the customer data storage. Example apparatus disclosed herein also include a parameter estimator to estimate the shifted-beta-geometric model parameters based on the merged shifted-beta-geometric model. Example apparatus disclosed herein also include a retention rate estimator to calculate the retention rate based on the shifted-beta-geometric model parameters and the merged shifted-beta-geometric model. Example model comparators disclosed herein include a parameter solver to solve the shifted-beta-geometric model for one of the shifted-beta-geometric model parameters, a variable definer to define a survivability variable related to the survivability of a customer based on the merged shifted-beta-geometric model, a simplifier to substitute the survivability variable into the shifted-beta-geometric model to simplify the shifted-beta-geometric model, a linear relationship definer to establish a linear relationship between a first one of the shifted-beta-geometric model parameters and a second one of the shifted-beta-geometric model parameters, a matrix definer to define a matrix based on the linear relationship between the first and second shifted-beta-geometric model parameters, and an equation generator to generate a system of equations to be implemented to determine the customer retention rate.

FIG. 1 is a schematic illustration of an example customer retention analysis engine 100 coupled to an example customer data storage 102. In the illustrated example of FIG. 1, the customer retention analysis engine 100 includes a survivability data retriever 104, a retention rate model generator 106, a shifted beta-geometric (sBG) distribution generator 108, a model modifier 110, a model comparator 112, a parameter estimator 114, and a retention rate estimator 116. In operation, the example customer retention analysis engine 100 estimates a customer retention for a forecast time period (e.g., a second time period for a future duration) based on data from a first time period (e.g., a most recent number of days, months, years, etc.). The example customer retention analysis engine 100 invokes the survivability data retriever 104 to obtain and/or otherwise retrieve data from the customer data storage 102 related to survivability of a customer (e.g., customer retention) during the first time period. For example, survivability data may include a number of years each individual has been a customer of a particular business. In some examples, the forecast period is set by a user. The forecast period is a time period for which the user is to predict a retention rate. For example, a forecast period may be five years.

The example retention rate model generator 106 generates a baseline retention rate model based on the survivability data associated with an observed duration of interest and retrieved by the survivability data retriever 104. In some examples, the retention rate model generator 106 generates the baseline retention rate model in a manner consistent with example Equation 1 to the acquired survivability data, where $r_t$ is a retention rate, t is time, and S(t) and S(t−1) are survivor functions indicative of a survivability (S), which reflects a probability that a customer has survived to time t or time t−1.

$$r_t = \frac{S(t)}{S(t-1)} \qquad \text{Equation 1}$$

The example sBG distribution generator 108 generates a shifted beta-geometric distribution model of the survivability data in a manner consistent with example Equation 2. In some examples, the sBG distribution generator 108 applies example Equation 2 to apply sBG principles to estimate survivability (S), where B(γ,δ+1) and B(γ,δ) are the Beta functions, where δ and γ are parameters of the sBG model.

$$S(t \mid \gamma, \delta) = \frac{B(\gamma, \delta+t)}{B(\gamma, \delta)} \quad t = 1, 2, \ldots \qquad \text{Equation 2}$$

The example model modifier 110 modifies the baseline retention rate model of example Equation 1 based on the sBG distribution to create a modified retention rate model. In some examples, the model modifier 110 substitutes Equation 2 into Equation 1 to derive an expression for the modified retention rate associated with the sBG model, as shown by the illustrated example of Equation 3.

$$r_t = \frac{\delta + t - 1}{\delta + \gamma + t - 1} \qquad \text{Equation 3}$$

The example model comparator 112 merges or combines the baseline retention rate model (e.g., as shown in a manner consistent with example Equation 1) with the modified retention rate model (e.g., as shown in a manner consistent with example Equation 3) to create a merged sBG model in a manner consistent with example Equation 4, where γ and δ are parameters of the sBG model of example Equation 3.

$$\frac{\delta + t - 1}{\delta + \gamma + t - 1} = \frac{S(t)}{S(t-1)} \qquad \text{Equation 4}$$

Figure 2:
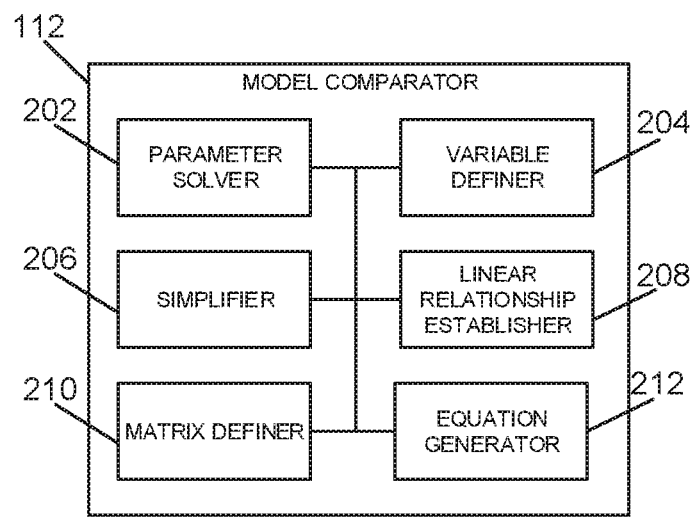
FIG. 2 is a schematic illustration of an example model comparator that may be implemented with the example customer retention analysis to determine a predicted customer retention.

Additional detail of the example model comparator 112 of FIG. 1 is depicted in the illustrated example of FIG. 2 with additional detail. The example model comparator 112 of FIG. 2 includes an example parameter solver 202, an example variable definer 204, an example simplifier 206, an example linear relationship establisher 208, an example matrix definer 210, and an example equation generator 212. The combination of the models results in defining a survivability variable to represent the predicted retention rate by simplifying Equation 4 using example Equations 5-10 below.

The example parameter solver 202 solves the merged sBG model of example Equation 4 for a first parameter, γ (gamma), as shown in example Equation 5, where γ is the first parameter and δ (delta) is a second parameter of the retention rate model.

$$\gamma = \left(\frac{S(t-1) - S(t)}{S(t)}\right)(\delta + t - 1) \qquad \text{Equation 5}$$

For mathematical convenience, the example parameter solver 210 rearranges example Equation 5 in a manner consistent with example Equation 6.

$$\gamma\left(\frac{S(t)}{S(t-1) - S(t)}\right) = \delta + t - 1 \qquad \text{Equation 6}$$

The example variable definer 204 defines a survivability variable $a_t$ in a manner consistent with the example Equation 7. The survivability variable $a_t$ is related to the survivability of a customer (e.g., the number of customers surviving to time t). In some examples, the number of active customers N(t) can be substituted for the probability that a customer survived S(t). The base unit N(0) cancels out, making the two expressions numerically identical.

$$a_t = \frac{S(t)}{S(t-1) - S(t)} \qquad \text{Equation 7}$$

The example simplifier 206 substitutes the example survivability variable $a_t$ from example Equation 7 into example Equation 6, as shown in Equation 8.

$$a_t \gamma = \delta + t - 1 \qquad \text{Equation 8:}$$

The example linear relationship definer 208 establishes a linear relationship between the first parameter γ and a second parameter δ, as shown in the illustrated example of Equation 9. The example sBG model (e.g., example Equation 2) ensures that this equality or linear relationship must be true for all values of t. As such, the example customer retention analysis engine 100 establishes an alternate computational procedure to solve for example parameters γ and δ. In particular, because the example model comparator 112 combined and/or otherwise merged the sBG model (e.g., example Equation 2) with the baseline retention rate model (e.g., example Equation 1), examples disclosed herein may avoid the computationally intensive MLE procedures and modeling iterations.

$$a_t \gamma - \delta = t - 1 \qquad \text{Equation 9:}$$

The example matrix definer 210 applies the linear relationship (e.g., example Equation 8) to define a matrix for multiple time periods, as shown in example Equation 10.

$$\begin{bmatrix} a_1 & -1 \\ a_2 & -1 \\ \vdots & \vdots \\ a_t & -1 \end{bmatrix} \begin{bmatrix} \gamma \\ \delta \end{bmatrix} = \begin{bmatrix} 0 \\ 1 \\ \vdots \\ t-1 \end{bmatrix} \qquad \text{Equation 10}$$

To facilitate improved calculation efficiency and/or a reduced computational burden when calculating customer retention rates, the example equation generator 212 generates a system of equations based on the matrix of Equation 10. The example system of equations is generated using the following steps and Equations 11-13. Generally speaking, the example equation generator 212 develops and/or otherwise solves the example system of equations to derive a closed-form solution to solve for the parameters γ and δ, which are used to calculate a retention rate without reliance upon computationally intensive MLE procedures. In the illustrated example, Equation 10 produces t equations (e.g., an equation for each time period analyzed) and has two unknowns (γ and δ). Thus, Equation 10 creates an overdetermined system, which may not have a solution that satisfies all of the equations exactly. Using a linear least squares approach that provides a closed-form solution, a value for each of the parameters γ and δ can be determined that best fits each of the equations in the system.

The matrix of example Equation 10 is solved, as shown in Equations 11- 13. Example Equation 11 is a simplified notation of example Equation 10, where the first column in the first matrix is $a_i$ for some number of time periods, the second column is −1, and the matrix on the right side is i−1 for each row corresponding to the number of time periods. Using the simplified form of example Equation 10 in a manner consistent with example Equation 11, the values for the parameters γ and δ can be determined using a set of equations that does not include any matrices (e.g., example Equations 19 and 20 below).

$$[a_i \mid -1]\begin{bmatrix} \gamma \\ \delta \end{bmatrix} = \begin{bmatrix} 0 \\ \vdots \\ n-1 \end{bmatrix} \qquad \text{Equation 11}$$

Example Equation 12 produces an expression for $X^T X$ in terms of $a_i$ and n.

$$X^T X = \begin{bmatrix} a_i \\ -1 \end{bmatrix}[a_i \mid -1] = \begin{bmatrix} \sum a_i^2 & -\sum a_i \\ -\sum a_i & n \end{bmatrix} \qquad \text{Equation 12}$$

Example Equation 13 is an expression for $X^T Y$ in terms of $a_i$ and n.

$$X^T Y = \begin{bmatrix} a_i \\ -1 \end{bmatrix}\begin{bmatrix} 0 \\ \vdots \\ n-1 \end{bmatrix} = \begin{bmatrix} \sum (i-1)a_i \\ -\frac{n(n-1)}{2} \end{bmatrix} = \begin{bmatrix} \sum i a_i - \sum a_i \\ -\frac{n(n-1)}{2} \end{bmatrix} \qquad \text{Equation 13}$$

Example Equations 12 and 13 complete the matrix multiplication and depict an example manner in which Equation 10 can be used to produce the expressions in terms of the known values $a_i$ and n.

The following example Equations 14-16 represent variables that can be defined to simplify the solution to the example matrix (e.g., example Equation 10), where c, d, and e are the variables.

$$c = \Sigma a_i \qquad \text{Equation 14:}$$

$$d = \Sigma a_i^2 \qquad \text{Equation 15:}$$

$$e = \Sigma i a_i \qquad \text{Equation 16:}$$

Example Equation 17 is the inverse of example Equation 12 with the variables c, d, and e of example Equations 14-16 substituted into the matrix.

$$(X^T X)^{-1} = \begin{bmatrix} d & -c \\ -c & n \end{bmatrix}^{-1} = \frac{1}{dn - c^2}\begin{bmatrix} n & c \\ c & d \end{bmatrix} \qquad \text{Equation 17}$$

Equation 18 is example Equation 17 multiplied by the matrix of example Equation 13.

$$(X^T X)^{-1} X^T Y = \frac{1}{dn - c^2}\begin{bmatrix} n & c \\ c & d \end{bmatrix}\begin{bmatrix} e - c \\ -\frac{n(n-1)}{2} \end{bmatrix} \qquad \text{Equation 18}$$

Example Equation 18 depicts a matrix form solution to determine the values for parameters γ and δ. From example Equation 18, the parameters $\hat{\gamma}$ and $\hat{\delta}$ are determined via matrix multiplication using the example parameter estimator 114.

$$\hat{\gamma} = \left(\frac{n}{2}\right)\frac{c - 2e + cn}{c^2 - dn} \quad \text{Equation 19}$$

$$\hat{\delta} = \frac{2c(c-e) + d(n-1)n}{2(c^2 - dn)} \quad \text{Equation 20}$$

Using the estimated parameters $\hat{\gamma}$ and $\hat{\delta}$ of example Equations 19 and 20, the retention rate estimator 116 determines the retention rate using known quantities (e.g., a time t, a number of customers still active at time t, a ratio of customers still active at time t compared to a baseline and/or initial number of active customers, etc.). Customer retention is an important aspect of customer behavior and loyalty. Modeling customer retention enables a provider of a service or product to predict behavior and loyalty of the customers. Predicting customer retention enables a provider of a service or product to analyze a distribution of customer lifetimes. Customer retention data can be used by businesses to improve marketing to customers and/or customer loyalty programs.

The system of linear equations defined by Equations 19 and 20 can easily be solved with less computational power than needed to determine the retention rate using conventional maximum likelihood procedures. The parameters $\hat{\gamma}$ and $\hat{\delta}$ are substituted into Equation 3 to solve for the retention rate. After the initial derivation of Equations 19 and 20, the closed form solution needs only to use Equations 19 and 20 to solve for the parameters that can be substituted into Equation 3 to determine the retention rate. Thus, instead of the typical iterative process used by the current MLE procedures, the closed form solution is a relatively simple and less computationally burdensome process to determine the retention rate, which does not require exhaustive iteration and uses less computing power of a processor.

Figure 3:
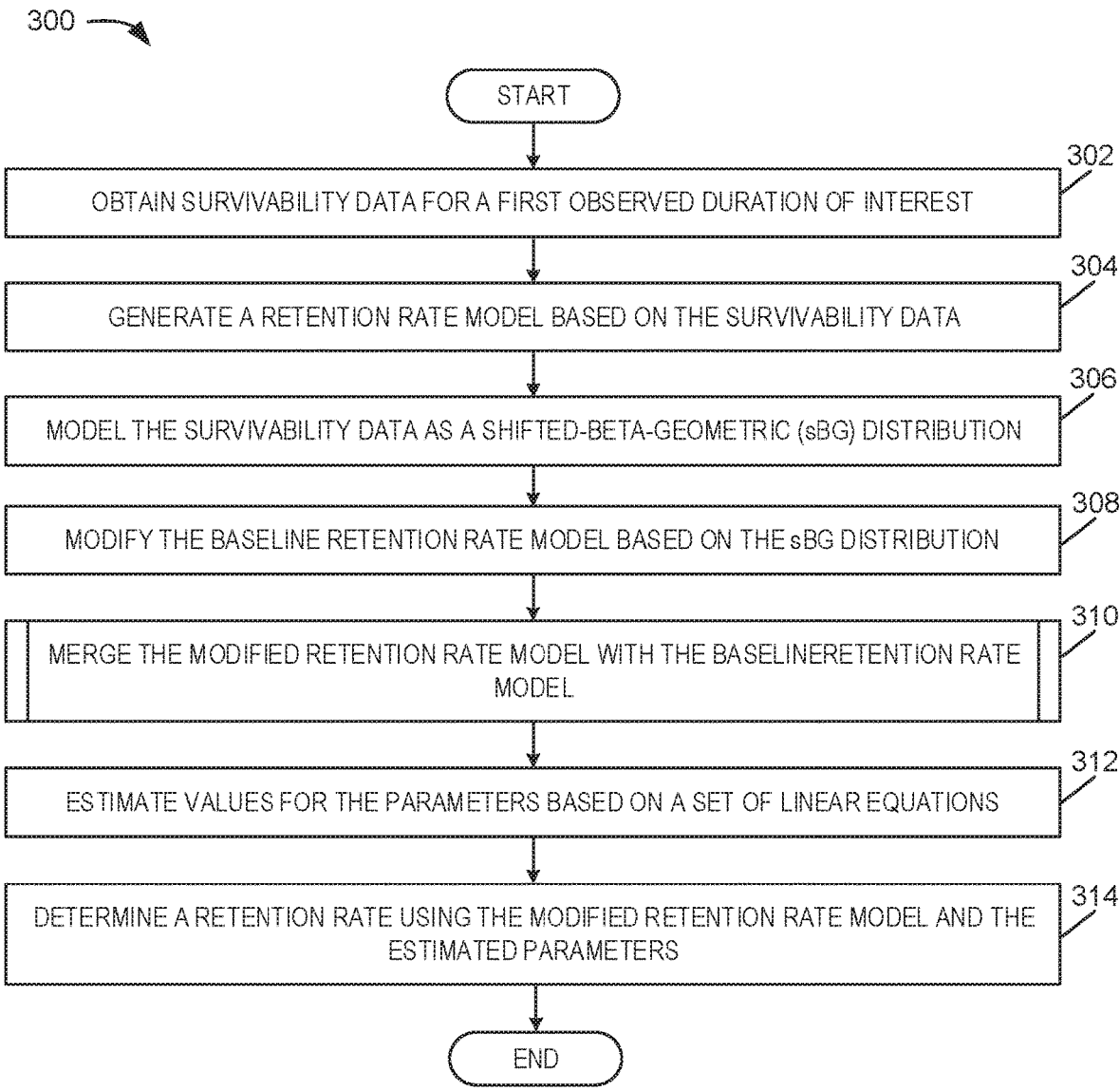
FIGS. 3-4 are flowcharts representative of example machine readable instructions that may be executed to implement the example product analysis engine of FIG. 1 and/or the example comparator of FIG. 2.
Figure 4:
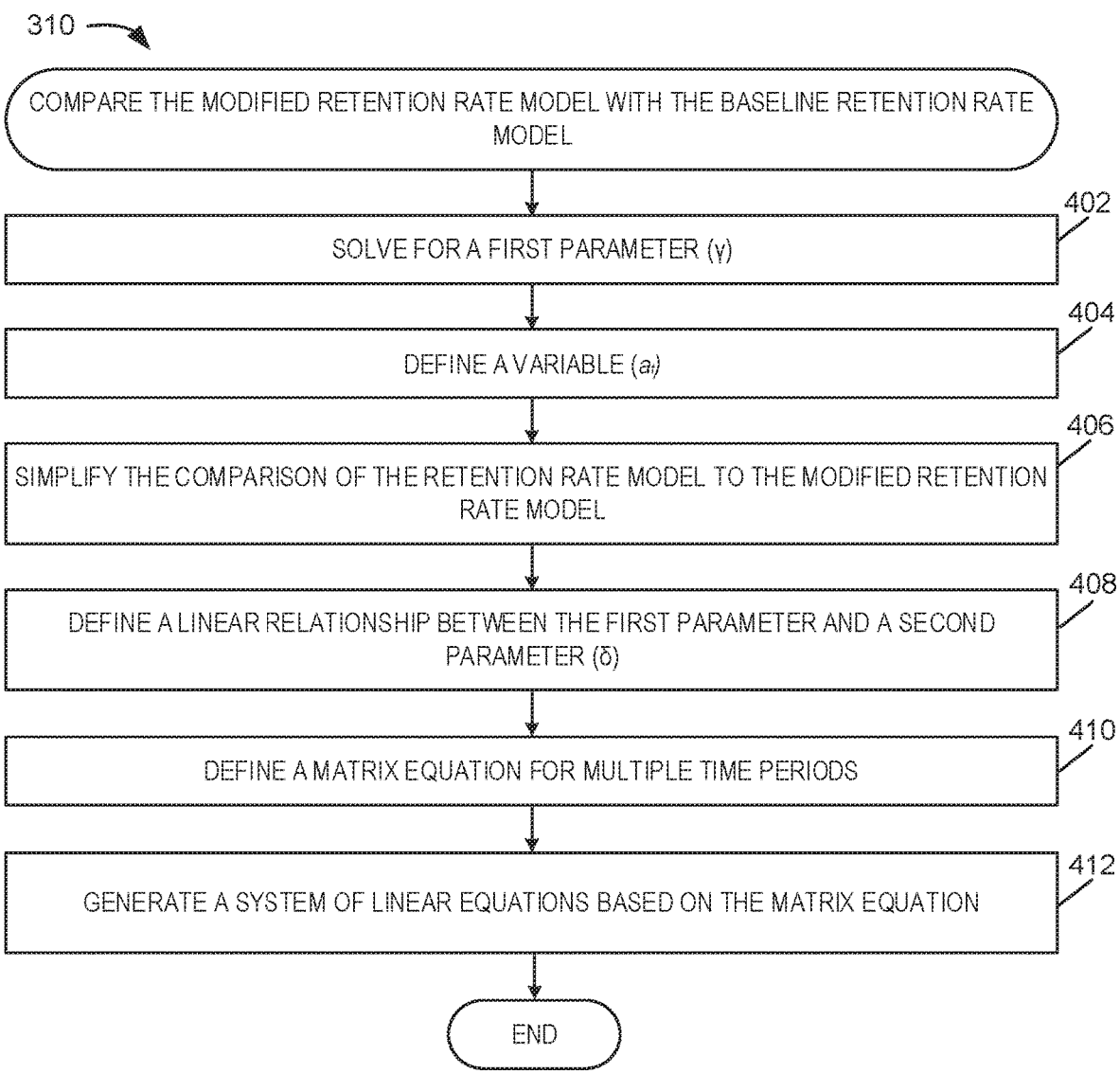

While example manners of implementing the analysis engine 100 of FIG. 1 and the model comparator 112 of FIG. 2. are illustrated in FIGS. 3 and 4, one or more of the elements, processes and/or devices illustrated in FIGS. 3 and 4 may be combined, divided, re-arranged, omitted, eliminated and/or implemented in any other way. Further, the example survivability data retriever 104, the example retention rate model generator 106, the example sBG distribution generator 108, the example model modifier 110, the example model comparator 112, the example parameter estimator 114, the example retention rate estimator 116, the example parameter solver 202, the example variable definer 204, the example simplifier 206, the example linear relationship establisher 208, the example matrix definer 210, the example equation generator 212, and/or, more generally, the example customer retention analysis engine 100 of FIGS. 1 and 2 may be implemented by hardware, software, firmware and/or any combination of hardware, software and/or firmware. Thus, for example, any of the example survivability data retriever 104, the example retention rate model generator 106, the example sBG distribution generator 108, the example model modifier 110, the example model comparator 112, the example parameter estimator 114, the example retention rate estimator 116, the example parameter solver 202, the example variable definer 204, the example simplifier 206, the example linear relationship establisher 208, the example matrix definer 210, the example equation generator 212, and/or, more generally, the example customer retention analysis engine 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example survivability data retriever 104, the example retention rate model generator 106, the example sBG distribution generator 108, the example model modifier 110, the example model comparator 112, the example parameter estimator 114, the example retention rate estimator 116, the example parameter solver 202, the example variable definer 204, the example simplifier 206, the example linear relationship establisher 208, the example matrix definer 210, the example equation generator 212, and/or, more generally, the example customer retention analysis engine 100 is/are hereby expressly defined to include a tangible computer readable storage device or storage disk such as a memory, a digital versatile disk (DVD), a compact disk (CD), a Blu-ray disk, etc. storing the software and/or firmware. Further still, the example customer retention analysis engine 100 of FIG. 1 may include one or more elements, processes and/or devices in addition to, or instead of, those illustrated in FIGS. 1 and 2, and/or may include more than one of any or all of the illustrated elements, processes and devices.

Flowcharts representative of example machine readable instructions for implementing the example customer retention analysis engine 100 of FIG. 1 are shown in FIGS. 3 and 4. In these examples, the machine readable instructions comprise a program for execution by a processor such as the processor 512 shown in the example processor platform 500 discussed below in connection with FIG. 5. The programs may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example programs are described with reference to the flowcharts illustrated in FIGS. 3 and 4, many other methods of implementing the example customer retention analysis engine 100 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 3 is a flowchart 300 representative of example machine readable instructions that may be executed to implement the example customer retention analysis engine 100 of FIG. 1. The instructions begin by instructing the survivability data retriever 104 to retrieve customer survivability data for a first observed duration of interest from the example customer data storage 102 (block 302). The example retention rate model generator 106 generates a baseline retention rate model based on survivability data associated with an observed duration of interest (block 304). In some examples, the baseline retention rate model may be generated in a manner consistent with example Equation 1. The example sBG distribution generator 108 generates a shifted-beta-geometric (sBG) model based on the survivability data (block 306). In some examples, the sBG distribution is generated in a manner consistent with example Equation 2. The example model modifier 110 modifies the baseline retention rate model based on the sBG distribution to generate a modified retention rate model (block 308). As described above, the modified retention rate model may be generated in a manner consistent with example Equation 3.

A model comparator 112 merges the modified retention rate model (e.g., example Equation 3) with the baseline retention rate model (e.g., example Equation 1) to generate a merged sBG model (block 310). The merged sBG model includes sBG model parameters (e.g., $\gamma$, $\delta$) operative to determine the retention rate. The merged sBG model may be generated in a manner consistent with Equation 4. Generating the merged sBG model reduces a computational burden typically required to calculate customer retention using the MLE procedures. As described in further detail below, the example flowchart 310 of FIG. 4 represents example instructions that may be implemented to generate a system of equations to determine values for the sBG parameters (e.g., $\gamma$ and $\delta$) of the merged sBG model.

The example parameter estimator 114 determines the sBG parameter values of the model the system of equations derived using the example model comparator 112 and the instructions depicted as flowchart 310 (block 312). For example, Equations 19 and 20 may be used to estimate the sBG parameters. The example retention rate estimator 116 determines the retention rate based on the sBG parameters, other known quantities, and the merged sBG model (block 314). The retention rate may be determined in a manner consistent with Equation 3. After determining the retention rate (block 314), the illustrated example of FIG. 3 is complete. Equations 19 and 20 represent a closed form solution which can be used to predict the retention rate. Thus, instead of the typical iterative process used by the current Maximum Likelihood procedures, the closed form solution is a relatively simple and less computationally burdensome process to determine the retention rate, which does not require exhaustive iteration and uses less computing power of a processor.

FIG. 4 illustrates additional details of the flowchart 300 described above in connection with FIG. 3 to compare the modified retention rate model. The instructions begin by the example parameter solver 202 solving the sBG model for a first sBG parameter (e.g., $\gamma$) (block 402). Solving for the first parameter may be completed in a manner consistent with example Equation 5. For mathematical convenience, example Equation 5 may also be written in a manner consistent with example Equation 6. The example variable definer 204 defines a survivability variable (e.g., $a_t$) related to customer survivability and based on the merged sBG model (block 404). The example survivability variable may be depicted in a manner consistent with at and/or implemented in a manner consistent with example Equation 7. The example simplifier 206 simplifies the sBG model depicted in example Equation 4 by substituting the example survivability variable (block 406). The sBG model may be simplified in a manner consistent with example Equation 8.

The example linear relationship determiner 208 defines a linear relationship between the first sBG parameter (e.g., $\gamma$) and the second sBG parameter (e.g., $\delta$) (block 408). The linear relationship is defined in a manner consistent with example Equation 9. The example matrix definer 210 defines a matrix equation for multiple time periods based on the linear relationship between the example sBG parameters (block 410). The matrix may be defined in a manner consistent with example Equation 10. The example equation generator 212 generates a system of equations to be implemented by the example parameter estimator 114 to determine the customer retention rate by solving the matrix (block 412). For example, the matrix may be solved in a manner consistent with using Equations 11-18. The system of equations may be defined for the sBG parameters in a manner consistent with Equations 19 and 20. The system of equations defined by the equation generator 212 may be used by the parameter estimator 114 in a manner consistent with the instructions depicted by the flowchart 300 of FIG. 3.

Figure 5:
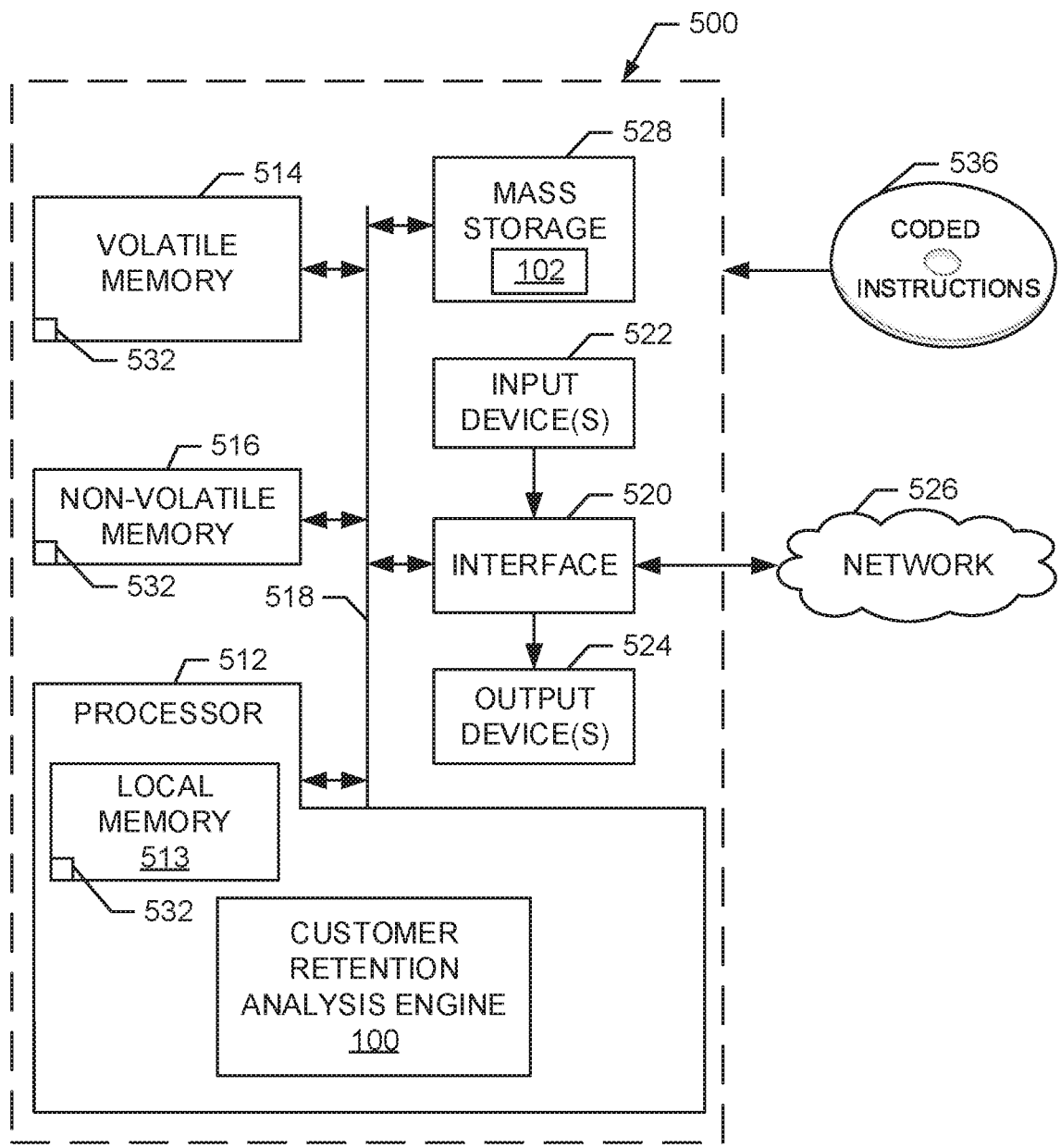
FIG. 5 is a block diagram of an example processor platform structured to execute the example machine readable instructions of FIGS. 3-4 to implement the example product analysis engine of FIG. 1 and/or the example comparator of FIG. 2.

FIG. 5 is a block diagram of an example processor platform 500 capable of executing the instructions of FIGS. 3 and 4 to implement the apparatus of FIGS. 1 and 2. The processor platform 500 can be, for example, a server, a personal computer, a mobile device (e.g., a cell phone, a smart phone, a tablet such as an iPad), a personal digital assistant (PDA), an Internet appliance, a gaming console, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 3 and 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture disclose determining a retention rate of customers using a closed form solution that reduces the amount of computing power and/or resources used by the processor relative to current methods of determining a retention rate of customers, such as an iterative maximum likelihood procedure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to determine a customer retention rate, the apparatus comprising:
   memory;
   retention rate model generator instructions;
   shifted-beta-geometric distribution generator instructions;
   model modifier instructions;
   model comparator instructions;
   variable definer instructions;
   linear relationship definer instructions;
   retention rate estimator instructions; and
   processor circuitry to:
      execute the retention rate model generator instructions to generate a baseline retention rate model based on a first set of survivability data associated with a first observed duration of interest, the baseline retention rate model including a first survivor function and a second survivor function indicative of survivability;
      execute the shifted-beta-geometric distribution generator instructions to generate a shifted-beta-geometric distribution model based on the first set of survivability data;
      execute the model modifier instructions to modify the first survivor function and the second survivor function of the baseline retention rate model based on first and second shifted-beta-geometric model parameters of the shifted-beta-geometric distribution model to create a modified retention rate model;
      execute the model comparator instructions to, in response to the creation of the modified retention rate model, combine the modified retention rate model and the baseline retention rate model to generate a merged shifted-beta-geometric model, the merged shifted-beta-geometric model including the first and second shifted-beta-geometric model parameters to determine the customer retention rate;
      execute the variable definer instructions to define a survivability variable of the first set of survivability data, the survivability variable corresponding to a predicted customer retention rate based on the merged shifted-beta-geometric model and a number of active customers;
      execute the linear relationship definer instructions to:
         facilitate linear least squares solving of the first and second shifted-beta-geometric model parameters by establishing a linear relationship therebetween;
         define a matrix for multiple time periods of interest based on the linear relationship; and
         derive a closed-form solution for the first and second shifted-beta-geometric model parameters based on the matrix; and
      execute the retention rate estimator instructions to:
         output the customer retention rate for a first forecast period based on the first and second shifted-beta-geometric model parameters, the first and second shifted-beta-geometric model parameters fitted to the modified retention rate model; and
         update the customer retention rate for a second forecast period based on a second set of survivability data, the second set of survivability data associated with a second observed duration of interest.

2. The apparatus as defined in claim 1, further including a customer data storage to store customer data, including the first set of survivability data and the second set survivability data.

3. The apparatus as defined in claim 2, further including survivability data retriever instructions, the processor circuitry to execute the survivability data retriever instructions to retrieve the first set of survivability data and the second set survivability data from the customer data storage.

4. The apparatus as defined in claim 1, further including parameter estimator instructions, the processor circuitry to execute the parameter estimator instructions to estimate the first shifted-beta-geometric model parameter based on the merged shifted-beta-geometric model.

5. The apparatus as defined in claim 1, wherein the processor circuitry is to execute the retention rate estimator instructions to determine the customer retention rate based on the first and second shifted-beta-geometric model parameters and the merged shifted-beta-geometric model.

6. The apparatus as defined in claim 1, wherein the processor circuitry is to execute the model comparator instructions to:
- solve the shifted-beta-geometric model for one of the first or second shifted-beta-geometric model parameters;
- substitute the survivability variable into the shifted-beta-geometric model to simplify the shifted-beta-geometric model;
- define the matrix based on the linear relationship between the first and second shifted-beta-geometric model parameters; and
- generate a system of equations based on the matrix to be implemented to determine the customer retention rate.

7. The apparatus as defined in claim 6, wherein the system of equations is derived from the matrix.

8. A computer-implemented method to determine a customer retention rate, the method comprising:
- generating, by executing an instruction with a processor, a baseline retention rate model based on a first set of survivability data associated with a first observed duration of interest, the baseline retention rate model including a first survivor function and a second survivor function indicative of survivability;
- generating, by executing an instruction with the processor, a shifted-beta-geometric distribution model based on the first set of survivability data;
- modifying, by executing an instruction with the processor, the first survivor function and the second survivor function of the baseline retention rate model based on first and second shifted-beta-geometric model parameters of the shifted-beta-geometric distribution model to create a modified retention rate model;
- in response to the creation of the modified retention rate model, combining, by executing an instruction with the processor, the modified retention rate model and the baseline retention rate model to generate a merged shifted-beta-geometric model, the merged shifted-beta-geometric model including the first and second shifted-beta-geometric model parameters to determine the customer retention rate;
- defining, by executing an instruction with the processor, a survivability variable of the first set of survivability data, the survivability variable corresponding to a predicted customer retention rate based on the merged shifted-beta-geometric model and a number of active customers; facilitating, by executing an instruction with the processor, linear least squares solving of the first and second shifted-beta-geometric model parameters by establishing a linear relationship therebetween;
- defining, by executing an instruction with the processor, a matrix for multiple time periods of interest based on the linear relationship;
- deriving, by executing an instruction with the processor, a closed-form solution for the first and second shifted-beta-geometric model parameters based on the matrix;
- outputting, by executing an instruction with the processor, the customer retention rate for a first forecast period based on the first and second shifted-beta-geometric model parameters, the first and second shifted-beta-geometric model parameters fitted to the modified retention rate model; and
- updating, by executing an instruction with the processor, the customer retention rate for a second forecast period based on a second set of survivability data, the second set of survivability data associated with a second observed duration of interest.

9. The method as defined in claim 8, further including retrieving the first set of survivability data and the second set of survivability data from a customer data storage.

10. The method as defined in claim 9, further including estimating the first shifted-beta-geometric model parameter based on the merged shifted-beta-geometric model.

11. The method as defined in claim 8, further including calculating the customer retention rate based on the first and second shifted-beta-geometric model parameters and the merged shifted-beta-geometric model.

12. The method as defined in claim 8, further including establishing a linear relationship between the first shifted-beta-geometric model parameter and the second shifted-beta-geometric model parameter.

13. The method as defined in claim 12, further including defining the matrix based on the linear relationship between the first and second shifted-beta-geometric model parameters.

14. The method as defined in claim 13, further including generating a system of equations to be implemented to determine the customer retention rate.

15. A non-transitory tangible machine readable storage medium comprising instructions that, when executed, cause a machine to at least:
- generate a baseline retention rate model based on a first set of survivability data associated with a first observed duration of interest, the baseline retention rate model including a first survivor function and a second survivor function indicative of survivability;
- generate a shifted-beta-geometric distribution model based on the first set of survivability data;
- modify the first survivor function and the second survivor function of the baseline retention rate model based on first and second shifted-beta-geometric parameters of the shifted-beta-geometric distribution model to create a modified retention rate model;
- in response to the creation of the modified retention rate model, combine the modified retention rate model and the baseline retention rate model to generate a merged shifted-beta-geometric model, the merged shifted-beta-geometric model including the first and second shifted-beta-geometric model parameters to determine a customer retention rate;
- define a survivability variable of the first set of survivability data, the survivability variable corresponding to a predicted customer retention rate based on the merged shifted-beta-geometric model and a number of active customers;
- facilitate linear least squares solving of the first and second shifted-beta-geometric model parameters by establishing a linear relationship therebetween;
- define a matrix for multiple time periods of interest based on the linear relationship;
- derive a closed-form solution for the first and second shifted-beta-geometric model parameters based on the matrix;
- output the customer retention rate for a first forecast period based on the first and second shifted-beta-geometric model parameters, the first and second shifted-beta-geometric model parameters fitted to the modified retention rate model; and
- update the customer retention rate for a second forecast period based on a second set of survivability data, the second set of survivability data associated with a second observed duration of interest.

16. The non-transitory tangible machine readable storage medium of claim 15, wherein the instructions, when executed, cause the machine to retrieve the first set of survivability data and the second set of survivability data from a customer data storage.

17. The non-transitory tangible machine readable storage medium of claim 16, wherein the instructions, when executed, cause the machine to estimate the first shifted-beta-geometric model parameter based on the merged shifted-beta-geometric model.

18. The non-transitory tangible machine readable storage medium of claim 15, wherein the instructions, when executed, cause the machine to determine the customer retention rate based on the first and second shifted-beta-geometric model parameters and the merged shifted-beta-geometric model.

19. The non-transitory tangible machine readable storage medium of claim 15, wherein the instructions, when executed, cause the machine to generate a system of equations to be implemented to determine the customer retention rate.

20. An apparatus to determine a customer retention rate, the apparatus comprising:
at least one memory;
instructions; and
processor circuitry to execute the instructions to:
generate a baseline retention rate model based on a first set of survivability data associated with a first observed duration of interest, the baseline retention rate model including a first survivor function and a second survivor function indicative of survivability;
generate a shifted-beta-geometric distribution model based on the first set of survivability data;
modify the first survivor function and the second survivor function of the baseline retention rate model based on first and second shifted-beta-geometric model parameters of the shifted-beta-geometric distribution model to create a modified retention rate model;
in response to the creation of the modified retention rate model, combine the modified retention rate model and the baseline retention rate model to generate a merged shifted-beta-geometric model, the merged shifted-beta-geometric model including the first and second shifted-beta-geometric model parameters to determine the customer retention rate;
define a survivability variable of the first set of survivability data, the survivability variable corresponding to a predicted customer retention rate based on the merged shifted-beta-geometric model and a number of active customers;
facilitate linear least squares solving of the first and second shifted-beta-geometric model parameters by establishing a linear relationship therebetween;
define a matrix for multiple time periods of interest based on the linear relationship;
derive a closed-form solution for the first and second shifted-beta-geometric model parameters based on the matrix;
output the customer retention rate for a first forecast period based on the first and second shifted-beta-geometric model parameters, the first and second shifted-beta-geometric model parameters fitted to the modified retention rate model; and
update the customer retention rate for a second forecast period based on a second set of survivability data, the second set of survivability data associated with a second observed duration of interest.

21. The apparatus as defined in claim 20, wherein the processor circuitry is to store customer data, including the first set of survivability data and the second set of survivability data, in a customer data storage.

22. The apparatus as defined in claim 21, wherein the processor circuitry is to retrieve the first set of survivability data and the second set of survivability data from the customer data storage.

23. The apparatus as defined in claim 20, wherein the processor circuitry is to estimate the first shifted-beta-geometric model parameter based on the merged shifted-beta-geometric model.

24. The apparatus as defined in claim 20, wherein the processor circuitry is to determine the customer retention rate based on the first and second shifted-beta-geometric model parameters and the merged shifted-beta-geometric model.

25. The apparatus as defined in claim 20, wherein the processor circuitry is to:
solve the shifted-beta-geometric model for one of the first or second shifted-beta-geometric model parameters;
substitute the survivability variable into the shifted-beta-geometric model to simplify the shifted-beta-geometric model;
define the matrix based on the linear relationship between the first and second shifted-beta-geometric model parameters; and
generate a system of equations based on the matrix to be implemented to determine the customer retention rate.

26. The apparatus as defined in claim 25, wherein the system of equations is derived from the matrix.

* * * * *